SCRAPER FOR FREEZING APPARATUS
Original Filed Jan. 24, 1948 2 Sheets-Sheet 1
Fig. 1.
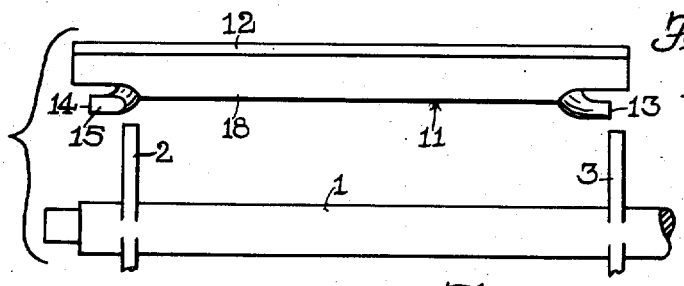
Fig. 2.
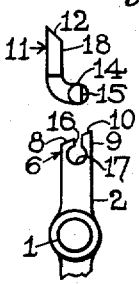
Fig. 4.
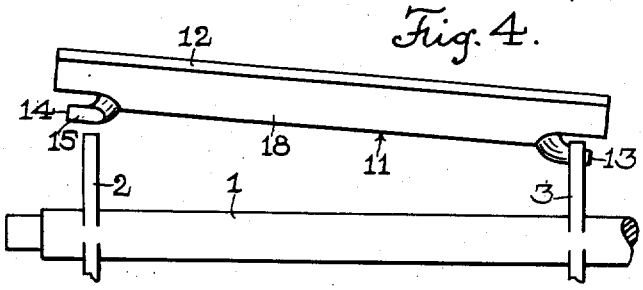
Fig. 3.
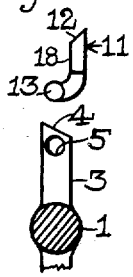
Fig. 5.
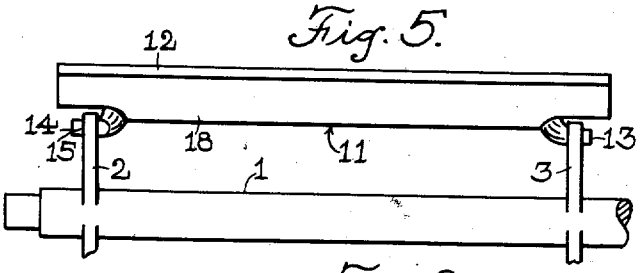
Fig. 6.
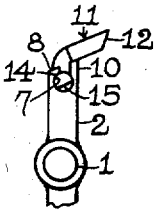
Fig. 8.
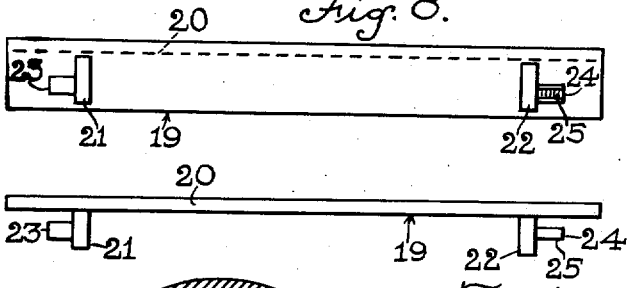
Fig. 9.
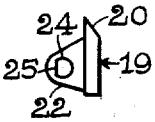
Fig. 10.
Fig. 7.
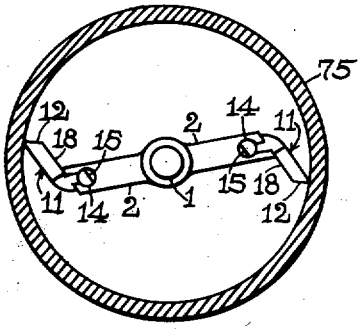
INVENTORS:
CHARLES ERICKSON,
AND ERICK SPELLMAN,
BY C. F. Am. Forssberg
ATTORNEY.

SCRAPER FOR FREEZING APPARATUS

Original Filed Jan. 24, 1948 2 Sheets-Sheet 2

INVENTORS:
CHARLES ERICKSON,
AND ERICK SPELLMAN,
BY C. F. Wm. Forssberg,
ATTORNEY.

Reissued Sept. 12, 1950

Re. 23,267

UNITED STATES PATENT OFFICE 23,267

SCRAPER FOR FREEZING APPARATUS

Charles Erickson and Erick Spellman,
New York, N. Y.

Original No. 2,470,691, dated May 17, 1949, Serial No. 4,126, January 24, 1948. Application for reissue May 17, 1950, Serial No. 162,595

15 Claims. (Cl. 259—134)

Matter enclosed in heavy brackets [ ] appears in the original patent but forms no part of this reissue specification; matter printed in italics indicates the additions made by reissue

This application is a continuation-in-part of our copending abandoned application Serial No. 505,858, filed October 11, 1943, for Scrapers for freezing apparatus.

The present invention relates to scrapers and the shafts supporting them such as used in confection refrigeration apparatus, ice cream freezers, frozen custard machines, etc., and particularly to demountable or removable scrapers and the shaft mountings therefor.

The main object of our invention is to provide a type of scraper or the like for an ice cream freezer or frozen custard machine which can be readily removed from the scraper shaft by a simple manipulation when the shaft assemblage is withdrawn and freed from the apparatus, but which scraper will be positively retained in direct assembled association with the shaft in operative position when the latter occupies its normal position within the apparatus.

Another object is to produce such a removable scraper which is free from screws, loose parts or appendages or the like, and demountably disposed upon the shaft in a position from which it may be removed without adjusting or releasing any parts, simply by shifting the scraper angularly in predetermined manner about the shaft when this shaft is released from the freezing apparatus.

A further object is to have a freezer shaft and associated scraper or scrapers which together form a sanitary assembly capable of being readily disassembled and cleaned at [all times.] *any time.*

It is also an object to have a scraper shaft and scrapers of the indicated character which *are* easily and conveniently assembled into operative relation and set into position in the apparatus to which they pertain, and as easily removed from the latter and taken apart for inspection and cleaning or for other purposes.

It is even an object to have a shaft and scraper assemblage of the mentioned character which may take several forms based on the same fundamental principles of construction and operation.

Other objects and the various advantages of our invention when applied in actual practice will be brought out in fuller detail in the following description when taken together with the accompanying drawings forming part hereof, and in which Figure 1 is a side elevation of at least a portion of a scraper or dasher shaft and a demountable scraper adapted to fit upon and be supported by the shaft, the scraper being shown in a position above the shaft preparatory to mounting the scraper on the shaft.

Figure 2 is an end view of said parts as seen from the left in Figure 1;

Figure 3 is another end view of the same parts as seen from the right in the same Figure 1;

Figure 4 is a side elevation of the shaft and scraper, similar to Figure 1 showing the right end of the scraper inserted or mounted in position on the shaft;

Figure 5 is a similar side elevation of the same parts with the scraper fully mounted in assembled association with the shaft at both ends;

Figure 6 is an end view of the shaft and scraper assembly as seen from the left in Figure 5;

Figure 7 is an end view or elevation of the freezing chamber of a confection freezing machine showing the shaft and scraper assembly installed;

Figure 8 is a side elevation of a modification of the scraper of Figures 1 to 7;

Figure 9 is an end view of the same modification as seen from the right in Figure 8;

Figure 10 is a top plan view of the scraper of Figures 9 and 10;

Figure 23 is an end elevation of the scraper alone of said Figure 22; while

Throughout the views, the same reference numerals indicate the same or like parts.

Figure 11:
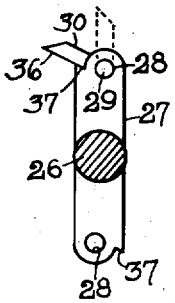
Figure 11 is an end elevation of a further modification of the shaft and scraper with the scraper shown in operative position.
Figure 14:
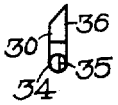
Figure 14 is an elevation of the other end of the scraper.
Figure 13:
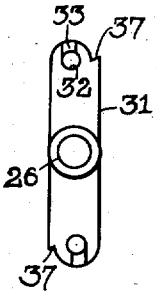
Figure 13 is an end elevation of the shaft as seen from the opposite end to that shown in Figure 11, the scraper being removed.
Figure 12:
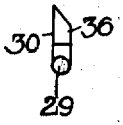
Figure 12 is an end view of the scraper alone of Figure 11.
Figure 15:
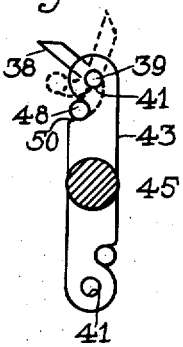
Figure 15 is an end view of another modification of the shaft and scraper of Figure 1, the scraper being in operative position.
Figure 16:
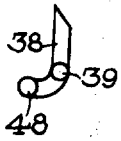
Figure 16 is an end view of the scraper alone of Figure 15.
Figure 17:
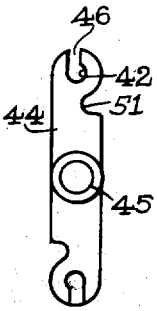
Figure 17 is an end elevation of the shaft alone of Figure 15 as seen from the opposite end than that shown in the latter view.
Figure 18:
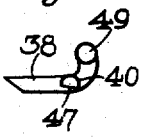
Figure 18 is an end view of the scraper of Figure 16 as seen from the other end than that shown in said latter figure.

In apparatus used for handling, containing or freezing foods, including confections such as ice cream, frozen custard and the like, it is highly essential that all parts coming into direct contact with the food or confection shall be accessible and easily removable and/or separable from the apparatus and other parts thereof for inspection and cleaning or sterilization at frequent intervals. This sanitary problem is certainly present in confection freezing apparatus, and emphatically involves the dashers and scraper shafts with their associated scrapers in rotary types of freezing apparatus and machines. As commonly constructed, the dasher or scraper shaft assembly retains the scrapers tightly in position on the shaft or at least hinged thereto in permanently captive condition, despite the fact that health departments in various localities throughout the country require such dashers or scraper shaft assemblies and the apparatus in which they are used to be kept scrupulously clean and sterile in order to maintain proper sanitary conditions.

We have found that it is possible so to construct a scraper shaft with associated scrapers, that the scrapers will be readily demountable or detachable from the shaft[s] when the latter [are] *is* withdrawn from the freezing apparatus, but will be positively retained in assembled association with the shaft[s] when the latter [are] *is* installed in operative position within such apparatus, the scrapers being then retained in position by the walls of said apparatus for normal co-operation with said walls when the shaft[s are] *is* rotated.

*This is accomplished by having the arms on the shaft provided with bearings forming pivot mountings in the outer projecting end portions thereof in which corresponding pivot members upon a scraper fit removably, the pivot members being mutually alined and in substantial parallelism with the effective scraping edge of the scraper involved. In addition, the arms are provided outwardly of the pivot mountings thereof with stops with which the scraper comes in contact when it is inclined with respect to the pivot mountings and in locked position when the shaft and scraper assembly is also inserted into the hollow freezing cylinder of the machine.*

Hence, in the practice of our invention, and referring now again to the accompanying drawings, a dasher or scraper shaft 1 is provided with a pair of arms 2, 3 spaced apart along the shaft and *preferably* rigid therewith (Figure 1) and projecting out therefrom substantially at right angles to the longitudinal axis of this shaft. As only part of the shaft is shown, the lower arms corresponding to those shown are broken off to condense the views, although arms 2 and 3 which project upward are shown in full, it being equally obvious that further arms may project from the portion of the shaft shown. However, merely one pair of [substantially parallel] arms, [namely] 2 and 3 are shown to represent any number of pairs of arms upon a complete dasher or scraper shaft.

Of the two arms 2 and 3, the latter arm has a sloping or inclined top 4 and an aperture 5 below the top (Figure 3), while the other arm 2 terminates in a slotted upper portion generally indicated at 6 (Figure 2) consisting of a lower end portion 7 with an inclined or sloping top 8 and a higher end portion 9 with a sloping or inclined top 10 substantially in line with the top 8 on end portion 7. The two inclined or sloping portions just mentioned, 8 and 10 on arm 2 lie in substantially the same plane with the top 4 on arm 3 for a reason which will now be explained.

The two arms described serve as supports for a scraper 11 which has an outer beveled scraping edge 12, and at the lower edge adjacent to one end a pivotal projection 13, while at the other end an oppositely directed pivotal projection 14 is rigidly fixed. Both projections are disposed in line, but the last named projection 14 has a flat portion 15 cut upon one side thereof. If the scraper is to be mounted on the shaft, it is first brought into a position approximately parallel to the shaft (Figure 1) and the pivot 13 then inserted endwise into aperture or bearing 5 in arm 3 (Figure 4), and thereafter the other pivot 14 is lowered into the slot 16 (Figures 5 and 6) in arm 2 until said pivot rests in a lower rounded bearing portion 17 in said arm which is wider at one side particularly, than the entrance portion of said slot. The scraper is directed in such fashion as to seat the pivot in said slot while the flat portion 15 is maintained parallel with the sides of the slot, the pivot being narrower in this position and hence readily entering the slot. After both pivots are seated in the two bearing portions 5 and 17, the scraper may be swung over so that its narrower or inner side 18 lies on the inclined tops 4 and 8 and 19 of the two arms.

*Of course, the principle is for all practical purposes the same, if the pivot mounting or bearing apertures 5 in arm 3 were open to the upper end 4 of the arm through a slot similar to slot 16 in connection with pivot mounting or bearing 17 on arm 2. While this would divide the inclined top 4 into two top portions spaced apart and similar to stops 8 and 10 on arm 2, this would not alter operation nor relations of the pivot members, mountings or the scraper to each other. Obviously, if both arms were open in this manner at their outer ends, and pivot members 13 and 14 both provided with flattened portions as in the case of pivot member 14 at 15, the pivot members could both be inserted downwardly directly through the upper ends of the arms into bearings or pivot mountings 5 and 17.*

*If the scraper were inserted either as last described or as previously described, it would in any event be swung or rocked over into an inclined locked position in which one side of the scraper rests in supporting contact with at least one stop upon an arm disposed outwardly of the bearing or pivot mounting proper thereof.*

The shaft thus assembled with the scraper may then be inserted into the freezing drum 19 of a confection refrigeration machine and the drum closed by a front dispensing cover or the like (not shown) and the machine otherwise prepared for operation by means and in a manner already well known in the art and therefor superfluous to illustrate.

Suffice it to state that the shaft with the scraper mounted thereon and thus disposed within the drum in operative position may be rotated by a prime mover (not shown), with the result that the scraper will be held against the inside wall of the drum and will scrape off frozen material continuously therefrom as long as the shaft is rotated. As the drum prevents the scraper from being swung out angularly from its position, it can not be disassociated from the shaft arms. Instead, it is first necessary for the shaft assemblage to be fully withdrawn from the freezing drum in order to swing the scraper upward into the position shown in Figure 6. In this view the flat portion 15 on pivot 14 provides sufficient clearance to allow the pivot to be raised through slot 16 and the other pivot then withdrawn from bearing 5 in the other arm 3.

From the foregoing it is evident that the scraper is easily removed from the supporting arms on the shaft for cleaning when the shaft assembly is out of the freezing drum or chamber, but positively retained in assembled relation when in operative position within said chamber without possibility of separation of the scraper from the shaft, accidentally or otherwise.

In Figures 8 to 10 a modification of the scraper is shown, generally indicated at 19 and provided with the conventional beveled upper or outer edge 20 similar to beveled edge 12 of scraper 11. Upon one side of scraper 19 and spaced from the ends thereof are a pair of rigidly fixed lugs 21, 22, lug 21 having a rigid stud 23 extending outwardly from the same upon the side remote from the other lug 22. From the latter lug 22 a similar stud 24 projects rigidly outward in the opposite direction to that of stud 23, both studs being thus alined. Stud 24 has a flat portion 25 to facilitate insertion of said stud into slot 16 on the shaft in similar fashion to the previously described insertion of pivot 14 of scraper 11. In fact, the two studs 23, 24 correspond to the two pivots or studs 13, 14 of said scraper 11, the construction of scraper 19 being simply an alternative scraper form with respect to scraper 11 and its pivots.

It is self-evident that the angle of inclination of the sloping tops of the supporting arms 2, 3 of shaft 1, the position of the flat portions 15 or 25 on the pivots or studs, or the particular side which is beveled on the scraper, are all features which may be chosen to suit conditions.

Another modification of the shaft and scraper ensemble is illustrated in Figures 11 to 14, wherein shaft 26 has supporting arm 27 provided with bearing 28 for the end stud 29 of a substantially flat scraper. The shaft also has a second supporting arm 31 with a stud seat bearing 32 opening upward in a narrow slot 33 for receiving end stud 34 at the other end of the scraper, this stud having the flat portion 35 to facilitate introduction into the slot 33. The two ends of the scraper project at 36, 36 in parallelism with the studs, while the supporting arms 27 and 31 are formed with stop shoulders 37, 37 upon which scraper projections 36, 36 may rest in operative position of the scraper. When inserting the latter, it occupies the upright initial position indicated in broken lines in Figure 11, after which it is turned over to rest on shoulders 37, 37.

A further modification which uses projections at the ends of the scraper is shown in Figures 15 to 18, in which the scraper 38 has end pivot studs 39, 40 fitting in bearings 41, 42 in supporting arms 43, 44, respectively which are spaced apart rigidly on shaft 45. As bearing 42 on arm 44 is open in the form of a narrow upward slot 46, the corresponding stud 40 has a flat clearance portion 47. In order to determine a proper inclination of the scraper, the latter has a pair of projections 48, 49 at the ends engaging in stop seats 50, 51 in the arms, the scraper occupying the initial position indicated in broken lines in Figure 15 during insertion to allow the stud 40 with its flat portion 47 to enter slot 46, when the scraper may subsequently be turned to the operative position shown in full lines in which stop projections 48, 49 rest in seats 50, 51.

Figure 19:
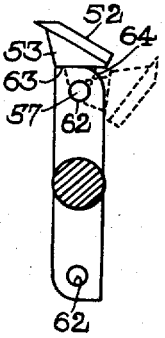
Figure 19 is an end elevation of still another modification of the shaft and scraper showing the latter in operative position.
Figure 20:
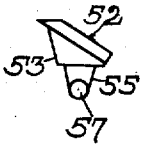
Figure 20 is an end elevation of the scraper alone thereof.
Figure 21:
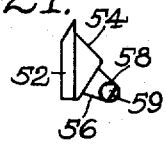
Figure 21 is an elevation of the scraper alone as seen from the other end than that shown in Figures 19 and 20.

In Figures 19, 20 and 21 a modification is shown which somewhat resembles that of Figures 8 to 10, but the scraper 52 has the wedge blocks 53, 54 fixed beneath the same with lugs 55, 56 provided with end studs 57, 58, the latter having the flat clearance portion 59 for facilitating mounting of the scraper on shaft 60. Supporting arm 61 on the latter has a bearing 62 for stud 57, while the upper end or top 63 of this arm is substantially at right angles with the sides of said arm, the corner being rounded for clearance at 64 to allow swinging the scraper when installing it, the blocks 53, 54 resting on the flat tops of the supporting arms (only arm 61 being shown) as for example block 53 resting on top 63 in Figure 19. For inserting the flattened stud in the other arm with slotted bearing seat (not shown) the scraper will initially occupy the position indicated in broken lines in Figure 19 just mentioned. Of course, if desired, the blocks 53, 54 may be a single long block extending to the ends of the scraper, but the construction shown is lighter.

Figure 22:
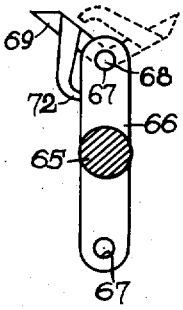
Figure 22 is an end elevation of a yet further modification of the shaft and scraper, with the scraper shown in operative position.
Figure 23:
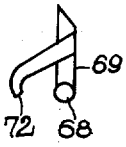
Figure 24:
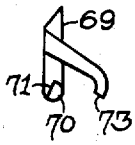
Figure 24 shows the opposite end of the same scraper.

Yet another modification is shown in Figures 22 to 24, in which the shaft 65 has a supporting arm 66 provided with bearing 67 for the end stud 68 of a scraper 69, a second arm spaced from arm 66 having a slotted bearing seat for the stud 70 with its flat portion 71, the latter arm and slot portion being superfluous to illustrate, as it follows the principles already outlined. However, at the ends of the scraper are a pair of stop arms 72, 73 disposed in effective positions to engage against the sides of the supporting arms and thereby determine a proper inclined operative position for the scraper as particularly shown in Figure 22. The scraper is swung to this position from the initial insertion position indicated in said Figure 22 in broken lines.

In all of the forms described, the main feature is that the scraper may be turned from operative position in which it is virtually locked in place on the supporting arms of the scraper shaft, to a liberating or assembling position in which the scraper is removable or capable of being mounted on the shaft, the supporting arms being engaged by portions of the scraper to determine an inclined operative position of said scraper on said arms.

Manifestly, other variations may be resorted to and parts and features may be modified or used without others within the scope of the appended claims.

Having now fully described our invention, we claim:

1. A dasher or scraper assembly for a confection refrigeration machine, including a rotatable shaft having a pair of substantially parallel spaced arms projecting rigidly from the side thereof, a scraper adapted to be supported upon said arms, one of the latter arms having an aperture near the end thereof and the other arm having an open slot in the outer free end of the arm, a pivot member fixed upon the scraper adapted to be inserted into the aperture in the one arm on said shaft, said pivot member being directed toward one end of the scraper and offset with respect to the general plane of the latter, a second similarly offset pivot member spaced from but substantially alined with the first mentioned pivot member and directed toward the other end of said scraper, the open slot in the second arm on the shaft being undercut to form a bearing for the second pivot member and the latter pivot member having a flat portion upon one side thereof to reduce the cross section thereof in one direction to provide for ready introduction of said second pivot member into said open slot and cause said slot to retain said pivot member when the scraper is swung over upon said arms and the assembly introduced into the drum or cylinder of the machine, with the scraper occupying an angular position with respect to the shaft of said assembly.

2. A dasher or scraper assembly for a confection refrigeration machine, including a rotatable shaft having a pair of substantially parallel spaced arms projecting rigidly from one side thereof, a scraper adapted to be supported upon said arms, one of these arms having an aperture near the end thereof and the other arm having an open undercut slot in the outer free end thereof, a pivot member fixed upon the scraper and adapted to be inserted in the aperture in the first mentioned arm, said pivot member being offset with respect to the plane of the scraper and directed toward one end of the latter, a second pivot member spaced from but substantially alined with the first mentioned pivot member and directed toward the other end of said scraper and also offset with respect to the plane thereof, inclined scraper seats upon the ends of said arms determining operative relation between the scraper and the cylinder of the machine in a position of the scraper in which it is disposed at an angle with a plane coinciding with a radius extending from the axis of said shaft when said scraper has been inserted, by its pivot members into said aperture and undercut open slot, respectively, the slot in said last mentioned position retaining the second pivot member assembled with the second arm, and said second pivot member having a flat portion upon one side to reduce the cross section thereof in one direction for ready insertion of the same pivot member into said slot and provide for swinging the scraper over upon the scraper seats on said arms about said pivot member to the mentioned operative position.

3. A dasher or scraper assembly for a confection refrigeration machine having a hollow freezing cylinder, including a rotatable shaft having a pair of supporting arms spaced apart and projecting rigidly from the same side of the shaft, a scraper adapted to be supported upon said arms, one of the arms having a bearing near the outer free end thereof and the other arm having an open slot in the outer free end of the latter, a pivot member fixed upon the scraper adapted to be inserted into the bearing in the one arm on said shaft, said pivot member being directed toward one end of the scraper, a second pivot member upon said scraper spaced from but substantially alined with the first mentioned pivot member and directed outwardly in the opposite direction to that of said first mentioned pivot member, stop means disposed externally upon the scraper assembly for determining an angular operative position of the scraper with respect to the shaft, the open slot in the second arm on said shaft being undercut to form a bearing for the second pivot member and the later pivot member having a reduced clearance portion upon one side to reduce the cross section thereof in one direction to provide for ready introduction of said second pivot member into said open slot and cause said slot to retain said pivot member when the scraper is swung upon said arms into said operative position and the scraper assembly introduced into said cylinder of the machine, the scraper in the operative position within said cylinder being prevented by the latter from swinging out into releasing position with respect to the open slot and the second pivot member engaged therein.

4. A dasher or scraper assembly according to claim 3, wherein the stop means includes a projection upon at least one end of the scraper and a corresponding stop portion upon at least one arm on the shaft against which said projection engages to determine the operative position of the scraper.

5. A dasher or scraper assembly according to claim 3, wherein the stop means includes a shoulder upon at least one arm and a corresponding projecting portion upon at least one end of the scraper engaging against the shoulder in the operative position of said scraper.

6. A dasher or scraper assembly according to claim 3, wherein the stop means includes a top on each of the supporting arms and a projection adjacent to the ends upon the scraper serving to space the latter away from the tops of the arms and thereby determine the operative position of said scraper with respect to said arms and shaft.

7. A dasher or scraper assembly according to claim 3, wherein the stop means includes end projections upon the scraper substantially parallel to the pivot members, and corresponding seat portions upon the supporting arms for receiving said end projections in the operative position of said scraper with respect to said arms and shaft.

8. A dasher or scraper assembly according to claim 3, wherein the stop means includes projecting portions upon the scraper ends and corresponding shoulders upon the supporting arms for supporting said projecting scraper portions in the operative position of said scraper, the scraper with its pivot members and projecting portions being disposed substantially in the same plane throughout.

*9. A dasher or scraper assembly for a confection refrigeration machine having a hollow freezing cylinder, said scraper assembly including a rotatable scraper shaft; a pair of supporting arms projecting from a side of the scraper shaft in mutual spaced apart relation; a scraper adapted to be supported on the supporting arms and having a longitudinal scraping edge; one arm having an open undercut slot in the outer projecting end thereof and forming a pivot mounting, the other arm having a corresponding pivot mounting formed in the outer projecting end thereof; a pair of pivot members fixed upon said scraper in mutual alinement and substantially parallel to said scraping edge, said pivot members removably fitting in said pivot mountings on said arms and having a portion of reduced transverse section upon at least one pivot member adapted to pass into said open undercut slot in a predetermined position of said scraper and preventing removal from said slot in another angular position of the scraper, and both pivot members when inserted into said pivot mountings allowing angular adjustment of the scraper with respect to the scraper shaft about the axis of said pivot members and mountings; and stop means disposed upon the outer ends of said arms in effective po-*

*sitions to determine an inclined angular position of said scraper in which the scraper assembly fits within said hollow cylinder with the scraping edge of said scraper in contact with the interior of said cylinder and thereby retaining said pivot members upon said scraper in assembled relation to said pivot mountings.*

*10. A dasher or scraper assembly according to claim 9, wherein the stop means upon the arms and the scraper are so relatively disposed in assembled or mounted position of said scraper that the scraper engages with one side thereof against said stop means to determine the inclined angular position of said scraper.*

*11. A dasher or scraper assembly for a confection refrigeration machine having a hollow freezing cylinder, said scraper assembly including a rotatable scraper shaft; a pair of arms projecting from a side of the shaft in spaced apart relation, one arm having an open slot in the outer free end thereof and an inner undercut portion in the open slot inwardly of said outer free end forming a pivot mounting or bearing and the other arm having a corresponding pivot mounting or bearing in the outer portion of the latter; a pivot member fixed on said scraper and adapted to engage pivotally in the corresponding pivot mounting or bearing; a second pivot member fixed on said scraper in alinement with the first mentioned pivot member and both pivot members being substantially parallel to the scraping edge of said scraper, said second pivot member pivotally fitting in the inner undercut portion of said open slot and having a flattened portion upon at least one side reducing the cross section thereof to allow insertion into and removal from said open slot in a predetermined position of said scraper and both pivot members allowing angular displacement of the scraper with respect to the shaft about the axis of said pivot members and mountings; and stop means disposed outwardly of the pivot mountings at the outer ends of said arms for determining an inclined angular working position of said scraper when said scraper assembly is insertible into said hollow cylinder with the scraping edge of the scraper in contact with the inner wall of said hollow cylinder whereby to retain said pivot members locked in said pivot mountings and prevent removal of at least said second pivot member from the inner undercut portion of said open slot.*

*12. A dasher or scraper assembly for a confection machine having a hollow freezing cylinder, said scraper assembly including a rotatable scraper shaft; a pair of arms projecting from a side of the shaft in spaced apart relation; corresponding pivot mountings forming axially alined individual bearings in the outer portions of the arms; a pair of substantially alined pivot members mounted on said scraper in substantial parallelism with the scraping edge of said scraper and conditioned to engage pivotally in said pivot mountings, at least one arm having an open slot in the outer portion thereof communicating with the respective pivot mounting on said one arm, and at least the one pivot member adapted to engage therein having a reduced transverse section upon one portion allowing insertion of said one pivot member into said respective pivot mounting through the open slot in one angular position of said one pivot member; and stop means disposed on at least said one arm at the outer end of the open slot thereof for determining an inclined angular working position of said scraper when said scraper assembly is insertible into said hollow cylinder with the scraping edge of the scraper within the inner wall of said hollow cylinder, whereby to retain said pivot members locked in said pivot mountings and prevent removal of either pivot member from its respective pivot mounting.*

*13. A dasher or scraper assembly for a confection freezing machine having a hollow freezing cylinder, said scraper assembly including a rotatable scraper shaft; a pair of arms projecting from the scraper shaft in spaced apart relation; a scraper adapted to be supported on the arms and having an outer longitudinal scraping edge and an inner opposite longitudinal edge; said arms having individual pivot mountings formed in the outer projecting ends thereof, at least one of the pivot mountings being an undercut open slot; a pair of substantially alined pivot members mutually spaced apart on the scraper at least in the vicinity of the inner edge thereof in parallelism with the scraping edge, said pivot members removably fitting in the pivot mountings of said arms for pivotally supporting said scraper and allowing angular displacement of the scraping edge thereof about the axis of said pivot members and pivot mountings, and at least one of said pivot members having a portion of suitable transverse dimension in one direction to allow introduction thereof into or removal thereof from the open end of said undercut open slot in exclusively one angular position of the scraper with respect to the shaft; a stop means upon at least one of said arms disposed outwardly of the pivot mounting proper thereof for determining an inclined angular operative position of said scraper with respect to said shaft in which said stop means engages with a portion upon said scraper and the assembly as a whole is insertible into the hollow freezing cylinder with the scraping edge disposed against the inner wall of said cylinder and the scraper thereby locked in assembled relation with said scraper shaft and the arms thereon.*

*14. A dasher or scraper assembly according to claim 13, wherein the pivot members are disposed substantially in alinement with the inner longitudinal edge of the scraper.*

*15. A dasher or scraper assembly according to claim 13, wherein the pivot members are disposed relatively nearer to the inner longitudinal edge upon the scraper than to the scraping edge thereof, and the undercut open slot of one pivot mounting is open to the outer end of the arm involved, and wherein the stop means serves in any case to make supporting contact with a side portion upon said scraper in the inclined angular position of said scraper.*

CHARLES ERICKSON.
ERICK SPELLMAN.

REFERENCES CITED

The following references are of record in the file of this patent or the original patent:

UNITED STATES PATENTS

| Number | Name | Date |
|---|---|---|
| 618,811 | Bymaster | Jan. 31, 1899 |
| 1,751,813 | Hager | Mar. 25, 1930 |
| 2,141,045 | Ruttiman | Dec. 20, 1938 |
| 2,289,613 | Weinrich | July 14, 1942 |

FOREIGN PATENTS

| Number | Country | Date |
|---|---|---|
| 24,549 | Switzerland | June 11, 1902 |